US011159331B2

(12) United States Patent
Piron et al.

(10) Patent No.: US 11,159,331 B2
(45) Date of Patent: Oct. 26, 2021

(54) TRACEABILITY OF A MULTI-ACTOR JOB STRING BY BLOCK CHAIN, ALLOWING AT LEAST TWO LEVELS OF CONFIDENCE IN THE INFORMATION STORED

(71) Applicant: BULL SAS, Les Clayes Sous Bois (FR)

(72) Inventors: Charles Piron, Lyons (FR); Thomas Domingos, Lyons (FR); Steve Peguet, Choisy le Roi (FR)

(73) Assignee: BULL SAS, Les Clayes Sous Bois (FR)

( * ) Notice: Subject to any disclaimer, the term of this patent is extended or adjusted under 35 U.S.C. 154(b) by 287 days.

(21) Appl. No.: 15/846,017

(22) Filed: Dec. 18, 2017

(65) Prior Publication Data
US 2018/0176022 A1 Jun. 21, 2018

(30) Foreign Application Priority Data
Dec. 16, 2016 (FR) ...................................... 1662590

(51) Int. Cl.
*H04L 9/32* (2006.01)
*G06Q 20/40* (2012.01)
*G06Q 20/38* (2012.01)
*G06F 21/62* (2013.01)

(52) U.S. Cl.
CPC ........ *H04L 9/3263* (2013.01); *G06F 21/6218* (2013.01); *G06Q 20/383* (2013.01); *G06Q 20/389* (2013.01); *G06Q 20/4016* (2013.01); *H04L 9/321* (2013.01); *H04L 9/3213* (2013.01); *H04L 9/3234* (2013.01); *H04L 9/3236* (2013.01); *G06Q 2220/00* (2013.01); *H04L 2209/38* (2013.01)

(58) Field of Classification Search
CPC ...................................................... H04L 9/3263
See application file for complete search history.

(56) References Cited

U.S. PATENT DOCUMENTS

| 2016/0098723 | A1 | 4/2016 | Feeney | |
|---|---|---|---|---|
| 2017/0180314 | A1* | 6/2017 | Walker | .................... G06F 21/00 |
| 2017/0180341 | A1* | 6/2017 | Walker | .................... H04L 63/08 |
| 2018/0041345 | A1* | 2/2018 | Maim | .................... G06F 21/51 |

(Continued)

FOREIGN PATENT DOCUMENTS

| FR | 2878099 A1 | 5/2006 |
|---|---|---|
| WO | 2006053963 A1 | 5/2006 |

OTHER PUBLICATIONS

Search Report from French Patent App. No. FR1662590 dated Dec. 16, 2016.

(Continued)

*Primary Examiner* — Simon P Kanaan
(74) *Attorney, Agent, or Firm* — Meagher Emanuel Laks Goldberg & Liao, LLP

(57) ABSTRACT

Some embodiments are directed to a system for the traceability of a job string performed by multiple actors, including a database for storing the information generated for each job of the string, wherein each actor can, after having obtained a right of access to the database, add a first information element signed by a certificate obtained from a secured hardware device associated with the actor; and a second information element signed by a temporary certificate supplied by a security server, the first and second elements being associated with a timestamp in the database.

16 Claims, 1 Drawing Sheet

(56) References Cited

U.S. PATENT DOCUMENTS

2019/0050856 A1* 2/2019 Vintila ................. H04L 9/0825
2019/0073666 A1* 3/2019 Ortiz .................. G06Q 30/0207

OTHER PUBLICATIONS

Written Opinion from French Patent App. No. FR1662590 dated Dec. 16, 2016.
Thomas Hardjono, et al., "Draft—Please Do Not Distribute Verifiable Anonymous Identities and Access Control in Permissioned Blockchains", XP055392888, URL: http://connection.mit.edu/wp-content/uploads/sites/29/2014/12/ChainAnchor-Identities-04172016.pdf, Apr. 17, 2016, pp. 1-9.
Google: "Hyperledger Whitepaper", XP055342558, URL: http://www.the-blockchain.com/docs/HyperledgerWhitepaper.pdf, Feb. 6, 2017, 20 pages.

* cited by examiner

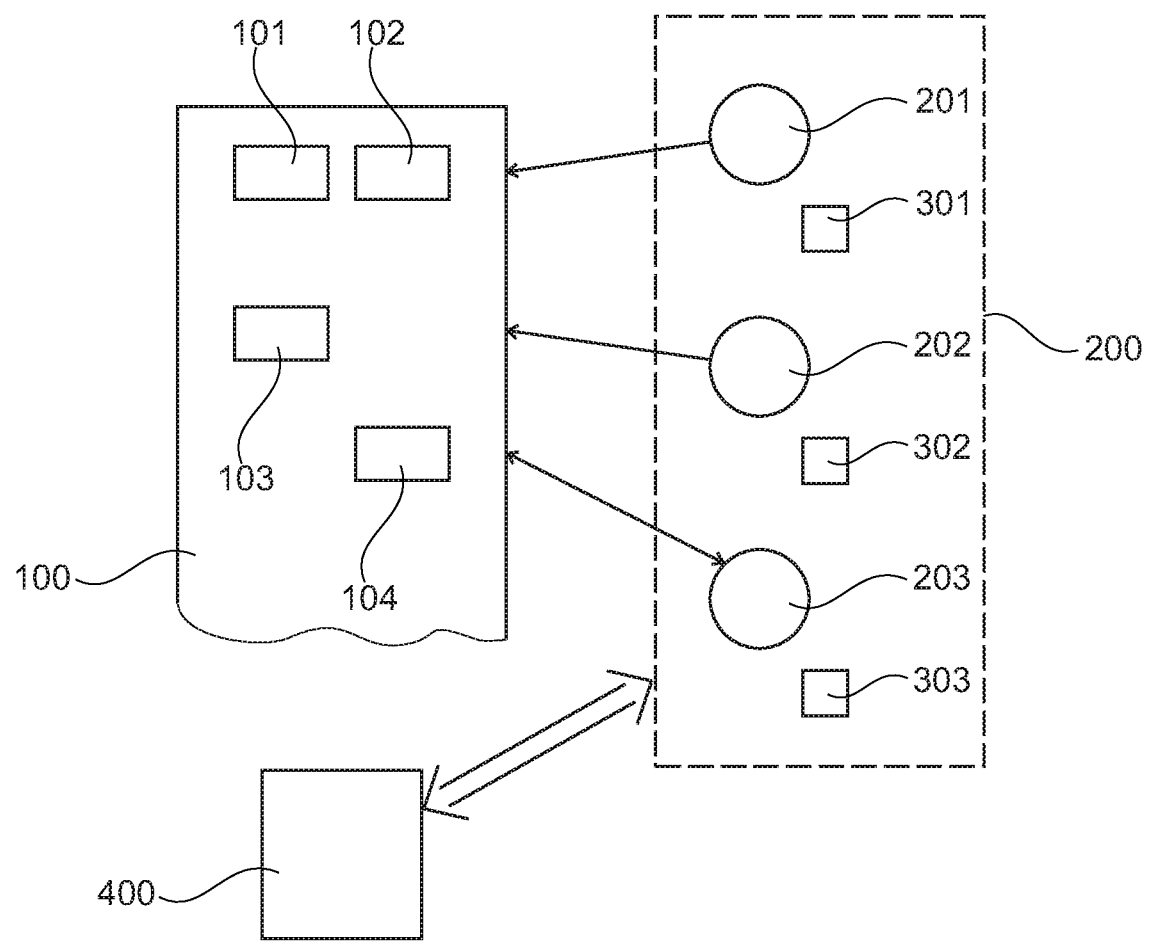

TRACEABILITY OF A MULTI-ACTOR JOB STRING BY BLOCK CHAIN, ALLOWING AT LEAST TWO LEVELS OF CONFIDENCE IN THE INFORMATION STORED

CROSS REFERENCE TO RELATED APPLICATION(S)

This application claims the priority benefit under 35 U.S.C. § 119 of French Patent Application No. 1662590, filed on Dec. 16, 2016, the content of which is hereby incorporated in its entirety by reference.

BACKGROUND

Some embodiments relate to the traceability of a job string involving multiple actors, with certification phases. It can in particular be applied to the management of products (manufactured line, agro-foodstuff line, etc.), in logistics (internal or external logistics chain), but also to the management of legal deeds (notarized deeds, insurances, etc.), deeds of sale or rental, curriculum vitae, etc., in sum, to any job string involving multiple actors to ensure the traceability of the job.

There are computing solutions that allow the traceability of a job string.

In general, these solutions are derived from private or public consortia based on a single and centralized management platform. The trust in the information linked to the chain of traceability is ensured by this centralized platform.

SUMMARY

However, in some situations, it is not possible or desirable to have a centralized platform. In the case of a multi-actor process, that is to say one involving distinct legal entities (multiple enterprises, etc.), it is not always or usually easy, legally or commercially, to decide on an actor who will play the central platform hosting role.

It is possible to envisage distributing the platform over multiple sites, each associated with one actor for example, but the solutions proposed by distributed databases like the NoSQL bases, for example Cassandra, are still based on a single reference base, called "master", which is replicated and therefore shared on each of the sites.

When the number of actors is great, such a mechanism based on replication becomes too complex to implement and its performance levels are greatly reduced.

Furthermore, the governance of this type of architecture is unique: one actor remaining master and the others slaves. Because of this, the main actor has a different role from those of the other actors.

The related art technology does not make it possible to ensure the traceability of a job string involving multiple actors and certification phases.

Some of the embodiments are directed to a solution that at least partially mitigates the abovementioned drawbacks.

More particularly, some embodiments are directed to a method, as well as an associated platform, that make it possible to establish, in a distributed and shared reference base, the trust between multiple actors, which can have specific interests and governances. It also targets managing certification phases and at least two information levels: certified information and non-certified information, these two information levels being able to be produced by one and the same actor.

Thus, some embodiments are directed to a method for traceability of a job string performed by multiple actors, in which the information generated for each job of the string is stored in a database, and in which each actor can, after having obtained a right of access to the database, add a first information element signed by a certificate obtained from a secured hardware device associated with the actor; and a second information element signed by a temporary certificate supplied by a security server, the first and second elements being associated with a timestamp in the database.

Some preferred embodiments include one or more of the following features which can be used separately or in partial mutual combination or in total mutual combination:
the secured hardware device belongs to a list including a USB key, a bi-key, a chip card, a microcontroller for a connected object, etc.
the database is a block chain;
the actors can access the information stored in the database by a human-machine interface.

Some embodiments relate to a use of the method described previously for the traceability of a product in a logistics chain, each step of the logistics chain corresponding to a job of the job chain.

Some embodiments relate to a use of the method described previously for the traceability of a legal deed, in which each step of the production of the deed corresponds to a job of the job string.

Some embodiments relate to a computer program including a code that can be executed by a digital equipment item to implement the method described previously.

Some embodiments relate to a system for the traceability of a job string performed by multiple actors, including a database for storing the information generated for each job of the string, and in which each actor can, after having obtained a right of access to the database, add a first information element signed by a certificate obtained from a secured hardware device associated with the actor; and a second information element signed by a temporary certificate supplied by a security server, the first and second elements being associated with a timestamp in the database.

Some preferred embodiments are directed to a system that includes one or more of the following features which can be used separately or in partial mutual combination or in total mutual combination:
the database is a block chain;
the system further includes a human-machine interface allowing access to the information stored in the database to the actors.

Other features and advantages of some embodiments will become apparent on reading the following description of some preferred embodiments, given as an example and with reference to the attached drawings.

BRIEF DESCRIPTION OF THE DRAWINGS

FIG. 1 schematically represents an exemplary implementation of some embodiments.

DETAILED DESCRIPTION OF THE EMBODIMENTS

Some embodiments can be implemented by using the block chain technology, because the latter natively makes it possible to meet the technical features of some embodiments, in particular in terms of distribution of the information and of trust in this information in the framework of a multi-actor context. Other implementations are possible and some embodiments should not be understood to be limited to this technology.

A block chain is an information storage and transmission technology, that can operate with no central control organ. It therefore makes it possible to produce a database in which the data are distributed among the actors acting on this base. It does however have management mechanisms that make it possible to be assured at all or most times of a sufficient level of trust in the non-falsification of the data.

The block chain technology is well known in the related art, in particular as the technology underpinning the digital currency "bitcoin". Reference can be made to the literature available on the internet, or, for example, to the patent applications US2016/0028552, US2016/0275461, etc., which propose extensions to this technology.

A block chain is based on the construction of transaction blocks, each block being able to be linked to the preceding one by a hash key. Creating or modifying a transaction in a block or an entire block therefore involves a cost, that of the computation of the key. However, falsifying a block entails falsifying all or most of the chain, such that the total cost becomes prohibitive and guarantees a level of trust in the non-falsification of all or most of a block chain.

FIG. 1 schematically represents an implementation of some embodiments. The element 100 represents the database which can be implemented by a block chain.

This database can be accessed by different actors 201, 202, 203 and a job string 200. These jobs can relate to the traceability of a product, of a legal deed or of any other physical or abstract object.

The example of the tracing of an item of baggage, the tracing of a notarized deed, will be seen later, but other exemplary applications can be envisaged, for which multiple actors have to intervene along a process involving this object and for which a trace of the jobs that it undergoes is to be retained. It may for example involve tracing the different locations of a baggage item (departure from the home of the traveller, registration at the airport, deplaning, etc.), the different steps of a notarized deed (offer to purchase property, certificate established by a technical service provider, signing of the deed of sale, etc.).

The actors 201, 202, and 203 represent legally responsible entities. These can authorize entities, or "certifiers", to sign and write elements in the block chain in their name. These "certifiers" may be:

authorized persons;
authorized connected objects.

Hereinbelow, reference will often be made to the term "actor" to describe the entity acting in their name.

These authorizations are temporary and have different trust levels, that is to say, as will be seen later, corresponding to a first type or to a second type of information element, based on its position in the job string.

The block chain 100 can be implemented in different ways. It allows the different actors the availability of the data repository that it contains, that is to say of the state, at a given moment, of the information concerning the job string. It may be distributed to different actors, in particular via a peer-to-peer mechanism.

According to some embodiments, the actors must or should obtain a right of access before being able to access the block chain 100. For this, they can obtain a temporary certificate from a security server 400.

The exchange between the actors 201, 202, and 203 and the security server 400 can operate like a public key infrastructure, PKI. Such an infrastructure makes it possible to manage the lifecycle of the digital certificates, or electronic certificates, which have a temporary lifespan in the context of some embodiments.

Once a certificate has been obtained allowing access to the block chain 100, the actors 201, 202, and 203 can add information elements 101, 102, 103, and 104 thereto, typically via a certifier respectively acting on their behalf.

At least two types of information elements can be distinguished, each implementing a different desired or necessary trust level.

A first type of information element corresponds to a high desired trust level. In order to guarantee this trust level, this first type of information element is signed by method of a certificate obtained from a secured hardware device 301, 302, and 303, associated with the actor, respectively 201, 202, and 203.

For example, this secured hardware device, or securing element, may be a chip card which has been previously supplied to the actor and containing such a certificate. It thus allows the actor to guarantee being the author of the information elements added by the actor. It may also be a USB key, a bi-key, a microcontroller for a connected object, etc.

The trust in the information element is thus assured by the trust that the other actors of the job chain place in this actor, and by this guarantee that he or she is indeed the author.

Typically, this information element may address a legal requirement: for example, it is a certification established by a specialist service provider, addressing standardization and/or legal requirements.

Furthermore, the actors may add information elements of a second type, corresponding to a lesser trust level than the first type. These actors may be known and certified, that is to say having certificates and security devices for inscribing elements of the first type or else be unknown, that is to say, only authorized to inscribe elements of the second type. These information elements may correspond to complementary information items, which may for example convey an informative content of interest for the different actors, but with no normative or legal requirement.

For this, these information elements may be signed by a temporary certificate supplied by the security server 400.

One and the same actor may add both an information element of the first type and an information element of the second type. He or she may also add multiple elements of one and the same type.

In the example of FIG. 1, the actor 201 adds an information element 101 of a fust type, and an information element 102 of a second type. The actor 202 adds an information element 103 of a fust type. The actor 203 adds an information element 104 of a second type.

Each addition of an information element by an actor of the string gives rise to a timestamping, by a system or an application that is certified and trusted, of the addition which is stored in the database 100 in association with the information elements.

This trusted timestamp makes it possible in particular to schedule the information elements relative to one another, as a function of the events having provoked their addition in the database. That makes it possible for example to create or control semantic links between the elements, typically if an element must or should be added mandatorily before another.

According to some embodiments, a portal is provided, in the form of a human-machine interface, in order to allow access to the information elements 101, 102, 103, 104 stored in the database 100.

In order to make some embodiments clearer, it is possible to describe a few concrete cases of use.

The case of a use of some embodiments for the traceability of a string linked to a property transaction can in particular be cited. Such a transaction involves multiple actors including, typically, a vendor, a purchaser, a notary and one or more specialist service providers.

These specialist service providers may be responsible for establishing diagnostics, as imposed in particular by national legislations, or for a commercial purpose. They may be diagnostics ensuring the actual surface area of a property, its compliance with health standards (absence of lead, of asbestos, etc.), its thermal insulation, etc.

Once their diagnostic work has been performed, the specialist service providers can add their diagnostic (or certification) report, in the form of an information element of the first type, that is to say signed by a chip card or any other security hardware device which has been made available to them.

In this way, each other actor of the chain (purchaser, notary, etc.) of the property transaction can know the diagnostic report and can place a high level of trust therein, since there is an assurance that it has indeed been added by an authorized service provider.

This same service provider may also add additional information, which may take the form of an information element of the second type, that is to say simply signed by a temporary certificate supplied by the security server 400. Such additional information may not be necessary to the property transaction, and in particular not useful to the notary for example, but may also be recommendations for improving the property, a commercial bid in this respect, etc., such as, for example, the exposition of the property, the improvements to be made to the insulation or the average sound level observed during the diagnostic process.

It will be understood that, in such a context of property transaction, two trust levels are of interest in order to take account of the certifying and/or legal elements, and the informative or commercial elements, in as much as the falsification has distinct consequences commercially and legally.

The timestamping of each addition of an information element makes it possible to manage the sequencing between the associated events: thus, the diagnostics must or should necessarily be dated before the signing of the contract of purchase-sale of the property. The signing of the contract may also give rise to the addition of an information element containing all or most of the contract, by the notary.

Another use of some embodiments may relate to the traceability of a product in a logistics chain. Different products may have to follow a cycle, for which each step may give rise to a marking in order to trace the progress thereof in this cycle.

A first example can include or can consist of tracking an agro-foodstuff product and thus being able to manage, in a decentralized manner, the different certification steps.

Another example can include or can consist of following a baggage item during aeroplane transportation. For example, the declaration of the baggage item, upon the purchasing of the ticket by the traveller, or before his or her trip, gives rise to the addition of a first information element in the database 100. This addition may be performed from an equipment item located in the home of the traveller or in the premises of a travel organizer, or a travel organization system.

The registration at the departure airport may give rise to the addition of a second information element in the database. At the arrival airport, the deplaning of the baggage may give rise to the addition of a third information element, and its reception by the traveller may give rise to the addition of a fourth information element in the database, just as the arrival of the baggage item and of the traveller at the destination hotel will ensure the travel organization of the traceability of the arrival of the traveller and of his or her goods.

As has been seen previously, this database 100 may be implemented by a block chain.

The granularity of the blocks may depend on the field of application of some embodiments, and on operational choices. For example, each actor may add a block to the chain, and add information elements, of first and/or second types, thereto. Also, it is possible to define daily blocks, within which the different actors may come to add the information elements (of first and/or second types), as so many transactions.

Obviously, some embodiments are limited to the examples and the embodiments described and represented, but are open to numerous variants accessible to the person of ordinary skill in the art.

The invention claimed is:

1. A method for traceability of a job string performed by multiple actors, comprising:
   storing information generated for each job of the job string in a database;
   obtaining, by each actor of the multiple actors, a right of access to the database;
   subsequently adding a first information element signed via a certificate obtained from a secured hardware device associated with an actor, of the multiple actors; and
   signing a second information element by a temporary certificate supplied by a security server;
   associating the first information element and the second information elements with a first timestamp in the database;
   subsequently adding a further information element signed via a further certificate obtained from a further secured hardware device associated with a further actor, of the multiple actors, and
   the further information element associated with a further time stamp; and
   managing sequencing between events, which are respectively associated with the first information element and the further information element, based on the first time stamp and the further time stamp.

2. The method according to claim 1, wherein the secured hardware device belongs to a list including at least one selected from the group consisting of a USB key, a bi-key, a chip card, or a microcontroller for a connected object.

3. The method according to claim 1, wherein the database is a block chain.

4. The method according to claim 1, wherein the multiple actors can access the information stored in the database by a human-machine interface.

5. The method according to claim 1, further including tracing of a product in a logistics chain, each step of the logistics chain corresponding to a job of the job string.

6. The method according to claim 1, further including tracing a legal deed, wherein each step of production of the legal deed corresponds to a job of the job string.

7. A computer program, comprising:
   code that can be executed by a digital equipment item to implement the method according to claim 1.

8. A system for the traceability of a job string performed by multiple actors, comprising:

a database for storing information generated for each job of the job string, and wherein each actor of the multiple actors can, after having obtained a right of access to the database, add a first information element signed by a certificate obtained from a secured hardware device associated with the actor, of the of the multiple actors; and a second information element signed by a temporary certificate supplied by a security server, the first information element and the second information element being associated with a first timestamp in the database; and a further information element signed via a further certificate obtained from a further secured hardware device associated with a further actor, of the multiple actors, and the further information element associated with a further time stamp; and the system performing processing including managing sequencing between events, which are respectively associated with the first information element and the further information element, based on the first time stamp and the further time stamp.

9. The system according to claim 8, wherein the database is a block chain.

10. The system according to claim 8, further including a human-machine interface allowing access to the information stored in the database to the multiple actors.

11. The method according to claim 2, wherein said database is a block chain.

12. The method according to claim 2, wherein the multiple actors can access the information stored in the database by a human-machine interface.

13. The method according to claim 3, wherein the multiple actors can access the information stored in the database by a human-machine interface.

14. The method according to claim 1, further including tracing of a product in a logistics chain, each step of the logistics chain corresponding to a job of the job string.

15. The method according to claim 1, further including tracing of a product in a logistics chain, each step of the logistics chain corresponding to a job of the job string.

16. The method according to claim 1, further including tracing of a product in a logistics chain, each step of the logistics chain corresponding to a job of the job string.

\* \* \* \* \*